US012033818B2

(12) United States Patent
Shinde et al.

(10) Patent No.: US 12,033,818 B2
(45) Date of Patent: Jul. 9, 2024

(54) CIRCUIT BREAKER HAVING INTERNAL TRANSIENT RECOVERY VOLTAGE CAPACITOR ASSEMBLY

(71) Applicant: HITACHI ENERGY LTD, Zürich (CH)

(72) Inventors: Sushil A. Shinde, Monroeville, PA (US); Carl R. Kurinko, North Huntingdon, PA (US); Matthew D. Cuppett, Uniontown, PA (US); Paul Jason Vladuchick, Cranberry Township, PA (US); Christian Daehler, Greensburg, PA (US); Thomas E. Hoburn, Mount Pleasant, PA (US)

(73) Assignee: HITACHI ENERGY LTD, Zürich (CH)

( * ) Notice: Subject to any disclaimer, the term of this patent is extended or adjusted under 35 U.S.C. 154(b) by 326 days.

(21) Appl. No.: 17/419,153

(22) PCT Filed: Dec. 18, 2019

(86) PCT No.: PCT/US2019/067195
§ 371 (c)(1),
(2) Date: Jun. 28, 2021

(87) PCT Pub. No.: WO2020/142215
PCT Pub. Date: Jul. 9, 2020

(65) Prior Publication Data

US 2022/0108853 A1 Apr. 7, 2022

Related U.S. Application Data

(60) Provisional application No. 62/786,692, filed on Dec. 31, 2018.

(51) Int. Cl.
*H01H 9/30* (2006.01)
*H01H 33/16* (2006.01)

(52) U.S. Cl.
CPC ............ *H01H 33/165* (2013.01); *H01H 9/30* (2013.01)

(58) Field of Classification Search
CPC .......... H01H 9/30; H01H 9/42; H01H 33/165; H01H 33/16; H01H 33/70; H01H 33/166;
(Continued)

(56) References Cited

U.S. PATENT DOCUMENTS 3,084,321 A 4/1963 Hinrichs et al.
4,434,332 A * 2/1984 Yanabu ................ H01H 33/143 218/144

(Continued)

FOREIGN PATENT DOCUMENTS

JP 55-3136 1/1980
JP 11-126544 5/1999

OTHER PUBLICATIONS

Translation of JPH11126544 (Original document published May 11, 1999) (Year: 1999).*

(Continued)

*Primary Examiner* — William A Bolton
(74) *Attorney, Agent, or Firm* — Sage Patent Group

(57) ABSTRACT

A circuit breaker having at least one capacitor assembly connected in parallel across a contact of the circuit breaker. The capacitor assembly can be housed with the contact within a sealed enclosure of the circuit breaker. The enclosure can be configured to house an insulating medium that is configured to reduce or quench an arc(s) that may form at least when the contact of the circuit breaker is displaced from a closed position to an open position. The capacitor assembly, which includes a transient recovery voltage (TRV) capacitor, can be configured to delay terminal fault and short line fault TRV and the rate of rise of the initial TRV (ITRV) that can appear across the open contact of the circuit breaker.

20 Claims, 5 Drawing Sheets

(58) Field of Classification Search
CPC .. H01H 33/56; H01H 2033/146; H01H 33/38; H01H 33/42
USPC .............................. 218/1, 144, 145; 335/177
See application file for complete search history.

(56) References Cited

U.S. PATENT DOCUMENTS

| | | | | |
|---|---|---|---|---|
| 4,810,840 | A * | 3/1989 | Okuno | H01H 33/16 218/145 |
| 4,816,624 | A | 3/1989 | Perrissin et al. | |
| 5,235,147 | A | 8/1993 | Pham et al. | |
| 5,668,360 | A * | 9/1997 | Perret | H01H 33/14 218/7 |
| 6,091,039 | A * | 7/2000 | Pham | H02B 13/0356 218/43 |
| 6,180,907 | B1 * | 1/2001 | Dufournet | H01H 33/16 361/115 |
| 6,229,236 | B1 | 5/2001 | Fisher et al. | |
| 7,078,643 | B2 * | 7/2006 | Rostron | H01H 33/166 218/144 |
| 7,652,476 | B2 | 1/2010 | De Rooij et al. | |
| 8,891,209 | B2 | 11/2014 | Häfner et al. | |
| 9,035,729 | B2 * | 5/2015 | Nomura | H02H 3/02 335/177 |
| 9,105,427 | B2 * | 8/2015 | Cuppett | H01H 31/08 |
| 9,595,409 | B2 * | 3/2017 | Vladuchick | H01H 33/55 |
| 2009/0067108 | A1 * | 3/2009 | Kruesi | H01H 33/165 361/722 |
| 2014/0146422 | A1 | 5/2014 | Nomura et al. | |
| 2019/0326748 | A1 * | 10/2019 | Shinde | H02H 9/041 |

OTHER PUBLICATIONS

Notice of Reasons for Refusal, Japanese Patent Application No. 2021-538315, mailed Aug. 23, 2022, 10 pages.
International Search Report and Written Opinion of the International Searching Authority, PCT/US2019/067195, mailed Feb. 27, 2020, 11 pages.

* cited by examiner

CIRCUIT BREAKER HAVING INTERNAL TRANSIENT RECOVERY VOLTAGE CAPACITOR ASSEMBLY

BACKGROUND

Embodiments of the present invention generally relate to circuit breakers. More particularly, but not exclusively, embodiments of the present invention relate to circuit breakers having internal transient recovery voltage (TRV) capacitor assemblies that are coupled in parallel across the contacts of a circuit breaker.

Various types of circuit breakers used to selectively open and close electrical connections utilize a sealed enclosure or tank that is filled with a liquid or gaseous dielectric insulating medium, including, for example, sulfur hexafluoride ($SF_6$), among other insulating gases and liquids. The dielectric insulating medium within the sealed enclosure can be used in at least an attempt to reduce and/or quench arcing, as well as prevent the flow of electrical current from electrically active parts and at least the enclosure, that can be associated at least with the opening of a contact of the circuit breaker. Moreover, such dielectric insulating mediums can be used in at least an attempt to prevent or quench arcing that can be associated with the operation of interrupters that are housed within the sealed enclosure of the circuit breaker, such as, for example, operation involving displacement of a moveable contact relative to a stationary contact of an interrupter.

Additionally, the opening of a contact of a circuit breaker, such as, for example, in response to a fault, can, in at least certain situations, result in the presence of relatively fast rising TRV across the contact of the circuit breaker contact, and, moreover, across the contacts of the circuit interrupter that is housed within the enclosure of the circuit breaker. Further, such TRV can attribute to unsuccessful interruption of the current, and thus, in at least certain situations, result in thermal/dielectric failure of the circuit interrupter.

Prior attempts to address TRVs in at least certain types of circuit breakers have included the use of external line-to-ground TRV capacitors. Yet, such external line-to-ground TRV capacitors typically require additional external mounting components and associated space, including for example, components for externally mounting of the external line-to-ground TRV capacitors to the circuit breaker or on a separate pedestal, which can increase manufacturing costs and expenses as well as potentially complicate providing sufficient clearance for at least certain components related to the circuit breaker. Additionally, external line-to-ground TRV capacitors are typically electrically coupled to only one side of the circuit breaker, and thus may not be effective for faults on both sides of the contact of the circuit breaker. Further, by being an external component, external line-to-ground TRV capacitors can be at relatively large distance from the contacts of the circuit breaker, which can adversely of the efficiency of the external line-to-ground TRV capacitors. Yet, attempts to address the adverse impact of such distances between external line-to-ground TRV capacitors and the contacts of the circuit breaker often involves use of capacitors having a relatively large capacitance, which can result in at least an increase in equipment cost.

BRIEF SUMMARY

An aspect of the present invention is a circuit breaker comprising an enclosure having an inner region and contacts housed within the inner region of the enclosure. A first side of the contact electrically can be coupled to a first electrical conductor of the circuit breaker, and a second side of the contact can be electrically coupled to a second electrical conductor of the circuit breaker. The circuit breaker can further include a capacitor assembly that can be housed within the inner region of the enclosure and connected in parallel across the contacts. Further, the capacitor assembly can include a transient recovery voltage capacitor.

Another aspect of an embodiment of the subject application is an apparatus comprising an enclosure having an interior region and a circuit interrupter that can be housed within the interior region of the enclosure. The circuit interrupter can have a first contact assembly and a second contact assembly, the first contact assembly comprising at least one moveable contact and a first shield, the second contact assembly comprising at least one stationary contact and a second shield. The at least one moveable contact can be configured to be (1) in contact with the at least one stationary contact when the circuit interrupter is in an electrically closed configuration, and (2) displaced from contact with the at least one stationary contact when the circuit interrupter is in an electrically open configuration. Additionally, the apparatus can include at least one capacitor assembly that can be housed within the interior region of the enclosure, the at least one capacitor assembly comprising a transient recovery voltage capacitor. Further, a first end of the at least one capacitor assembly can be in electrical contact with the first shield, and a second end of the at least one capacitor assembly can be in electrical contact with the second shield.

Additionally, an aspect of an embodiment of the subject application is an apparatus comprising at least one pole assembly having a first electrical conductor, a second electrical conductor, an enclosure, a circuit interrupter, and at least one capacitor assembly. The circuit interrupter and the at least one capacitor assembly can be housed within an interior region of the enclosure. Additionally, the at least one capacitor assembly can have a transient recovery voltage capacitor connected in parallel across a contact of the circuit interrupter.

BRIEF DESCRIPTION OF THE DRAWINGS

The description herein makes reference to the accompanying figures wherein like reference numerals refer to like pans throughout the several views.

Figure 1:
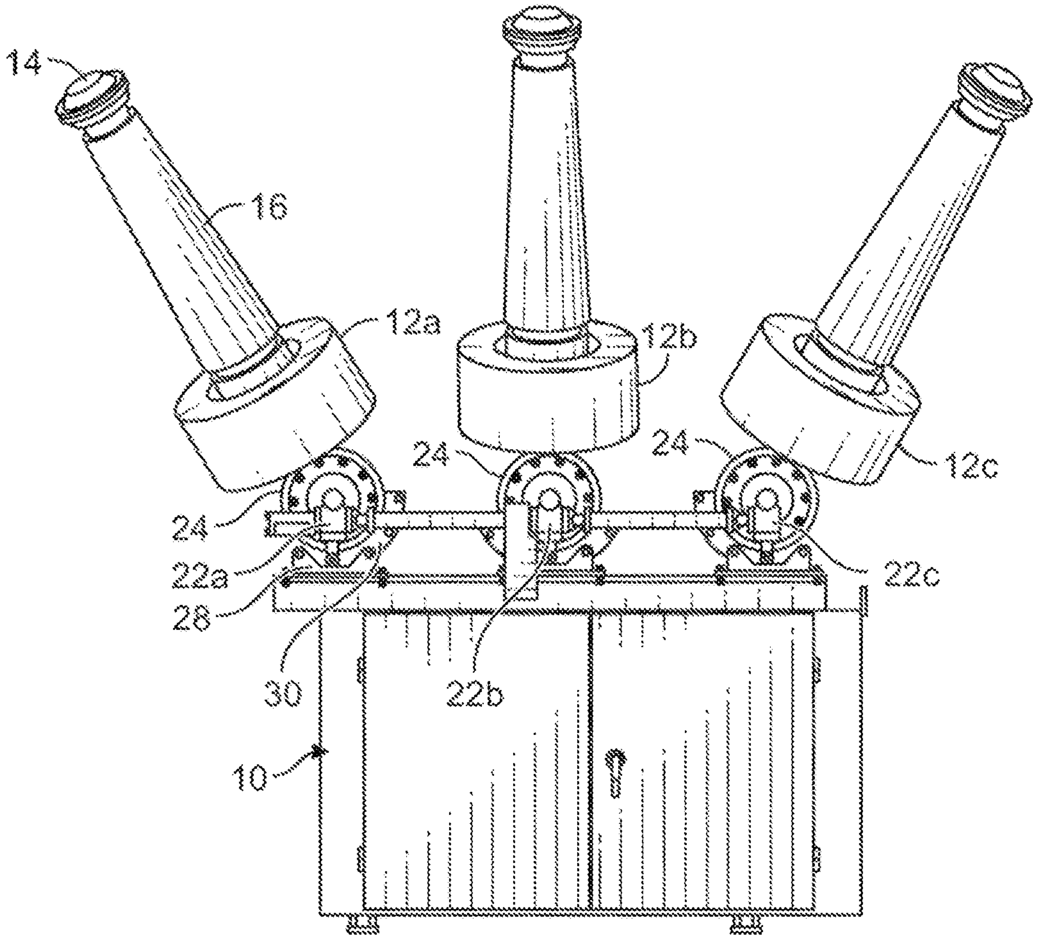
FIG. 1 (Prior Art)
FIG. 1 illustrates a front view of a conventional high voltage dead tank circuit breaker.

The foregoing summary, as well as following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 2:
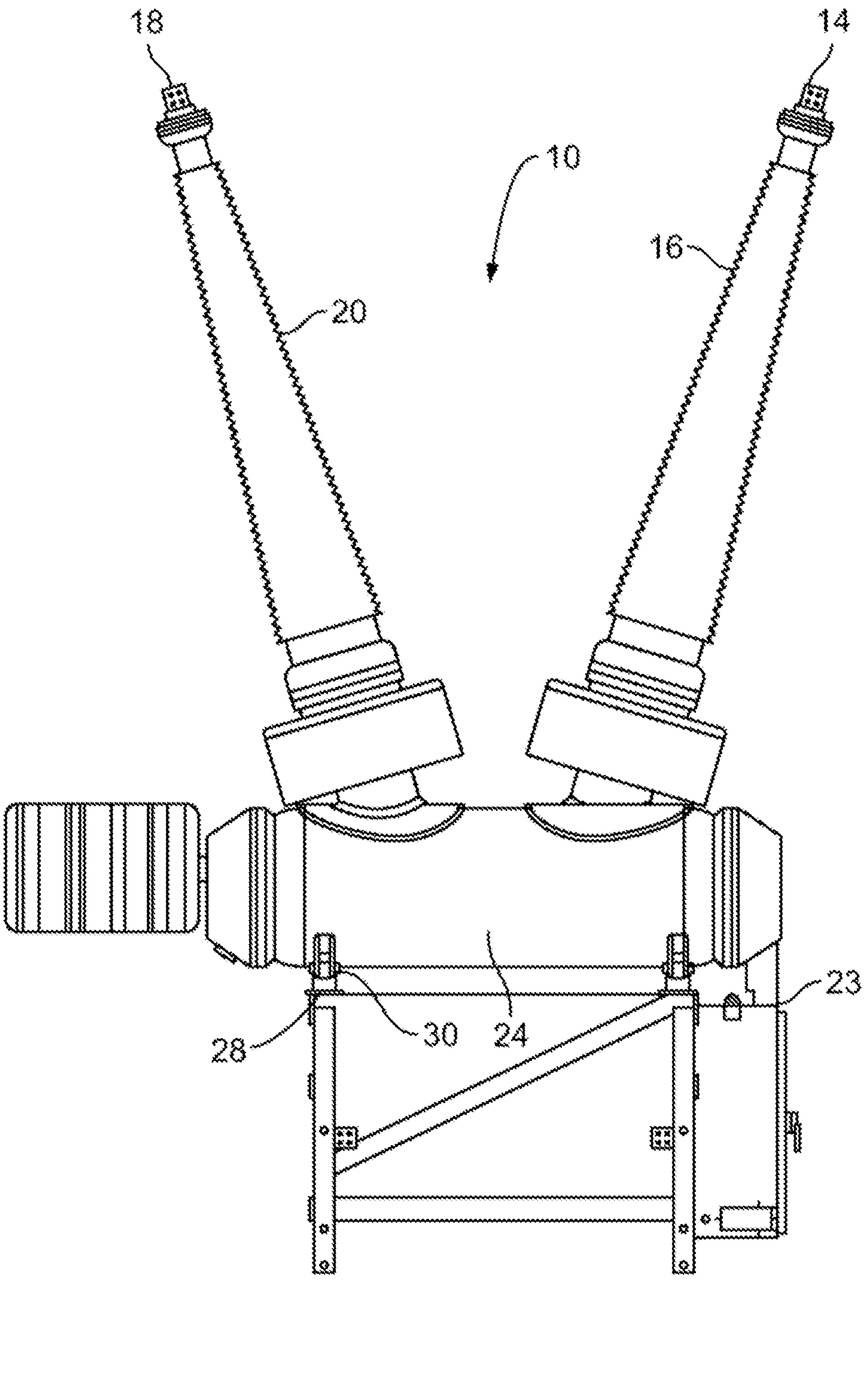
FIG. 2 illustrates a side view of the conventional circuit breaker of FIG. 1.

For purposes of illustration, FIGS. 1 and 2 depict a conventional dead tank circuit breaker, generally indicated at 10. According to the illustrated example, the circuit breaker 10 is a three-phase circuit breaker, and thus includes three pole assemblies including outer pole assemblies 12*a* and 12*c* and a central pole assembly 12*b*. Each pole assembly 12*a*, 12*b*, 12*c* includes a first electrical conductor 14 carried in a first bushing 16 and a second electrical conductor 18 carried in a second bushing 20. Electrical power lines are coupled to the first and second electrical conductors 14, 18, and the circuit breaker 10 selectively opens or closes the electrical connection there-between. A bell crank 22*a*, 22*b*, 22*c*, is associated with each respective pole assembly 12*a*, 12*b*, 12*c*, the bell cranks 22*a-c* in the illustrated example being interconnected by a gang-style linkage structure that includes interconnecting shafts so that all three pole assemblies 12*a*, 12*b*, 12*c* are actuated at the same time by one or more operating mechanisms, generally indicated at 23. Each pole assembly 12*a*, 12*b*, 12*c* includes an enclosure 24, which in this example is a dead tank, which can house the electrical contact(s) of the breaker 10, including, for example, one or more circuit interrupters. As shown in the illustrated example, each enclosure 24 is fixed to a support structure 28 by conventional bolts 30.

Figure 3:
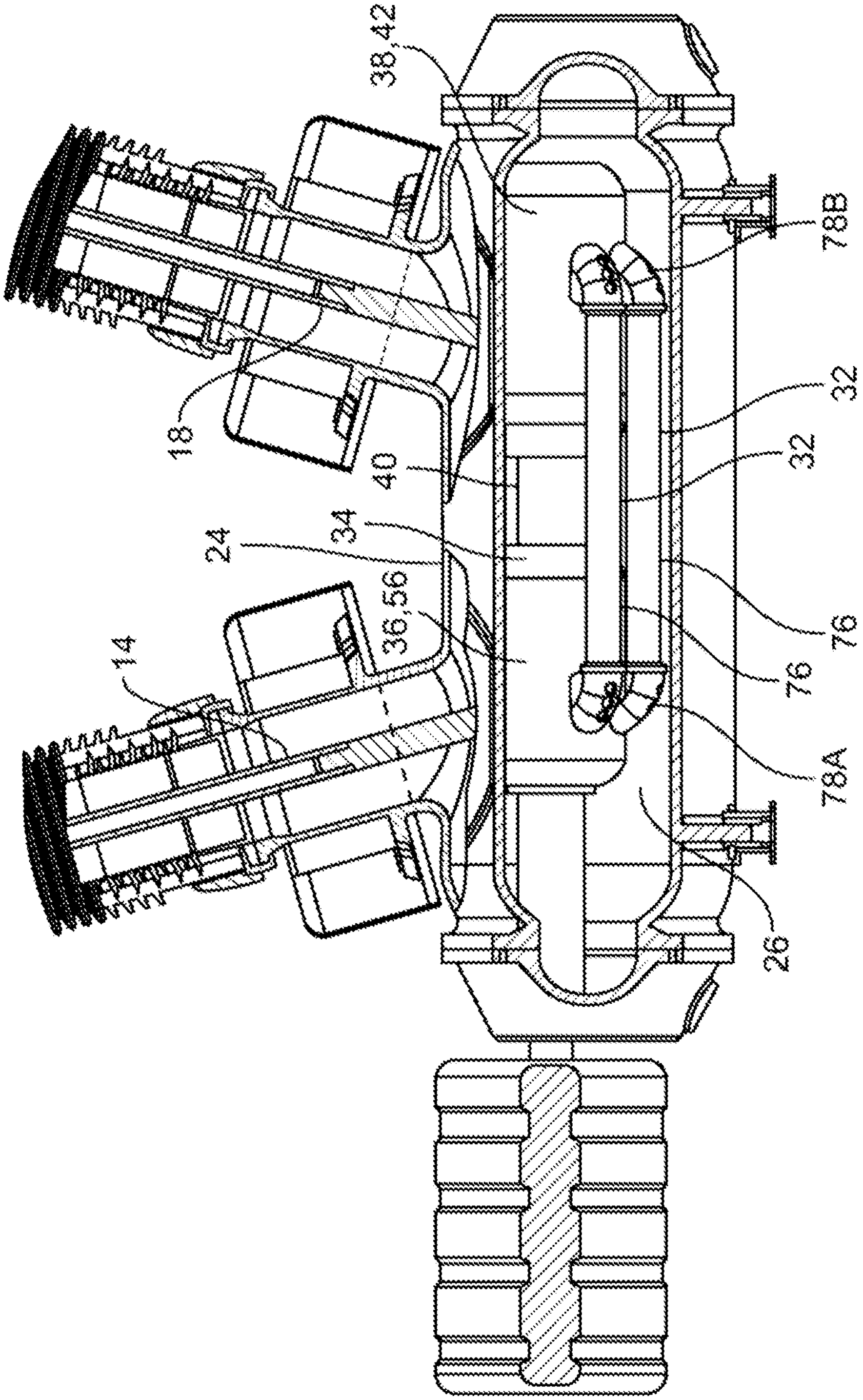
FIG. 3 illustrates a partial cutaway view of a portion of a sealed enclosure for a circuit breaker having internal capacitor assemblies according to an illustrated embodiment of the subject application.

The interior volume of the enclosure 24, as well as at least a portion of the entrance first and second bushings 16, 20, can be filled with a liquid or gaseous insulating medium 26 (FIG. 3). According to certain embodiments, the insulating medium 26 is a high pressure, electrically insulating gas, such as, for example, sulfur hexafluoride ($SF_6$), among other insulating gases. Alternatively, the insulating medium 26 is ambient or compressed air. According to other embodiments, the insulating medium can be a liquid, such as, for example, oil, among other liquid insulating mediums. The electrically insulating medium 26 can be utilized for a variety of different purposes. For example, contacts within the enclosure 24 can be subject to arcing or corona discharge during operation of the circuit breaker 10, such as, for example, as a moveable contact of a circuit interrupter of the circuit breaker 10 is displaced from an electrically closed position to a position relative to a stationary electrical contact of the circuit interrupter. Additionally, the insulating medium 26 can be utilized to quench such arcing. Further, given the properties of the insulating medium 26, the insulating medium 26 can also act as an insulator between conductive parts within enclosure 24 and the wall(s) of enclosure 24, among other electrically conductive parts or components of the circuit breaker.

FIG. 3 illustrates a primal cutaway view of a portion of a sealed enclosure 24 for a circuit breaker 10 having internal capacitor assemblies 32 according to an illustrated embodiment of the subject application. The sealed enclosure 24 houses at least one circuit interrupter 34 and a liquid or gaseous insulating medium 26. Additionally, as discussed below in more detail, the internal capacitor assemblies 32 are electrically arranged to be in parallel with the contacts of the circuit breaker 10, as well as arranged in parallel with respect to other internal capacitor assemblies 32. While FIGS. 1 and 2 illustrated an exemplary enclosure 24 in the form of a dead tank, the sealed enclosure 24 of the subject application can be an enclosure that, in addition to use as a dead tank, can also be configured for use with variety of other types of circuit breakers that utilize an insulating medium 26. For example, in addition to being used in connection with a dead tank circuit breaker, the enclosure 24 can be configured for use in connection with live tank circuit breakers, among other types of circuit breakers.

A variety of different types or styles of circuit interrupters 34 can be utilized with the circuit breaker 10, and can be at least partially, if not completely, housed within the sealed enclosure 24. For example, according to the illustrated embodiment, the circuit interrupter 34 comprises a puffer interrupter, as shown in at least FIG. 4. According to such an embodiment, the circuit interrupter 34 can include a first contact assembly 36 and a second contact assembly 38. According to the exemplary embodiment, the first contact assembly 36 can include components that are associated with a moving contact of the circuit interrupter 34, and the second contact assembly 38 that can include components that are associated with a stationary contact of the circuit interrupter 34. Additionally, an insulator tube 40 can adjoin opposing sides of the first and second contact assemblies 36, 38. Further, the insulator tube 40 can be configured such that at least portions of the second contact assembly 38 can be linearly displaced within the insulator tube 40 during the opening and closing of the contact of the circuit breaker 10.

The first contact assembly 36 can include at least a moving side shield 56, a puffer piston 58, a puffer cylinder 60, a plurality of transfer contacts 62, and one or more moving contacts 64, such as, for example, a moving arcing contact 66 and a main moving contact 68. According to certain embodiments, the contact 74 of the circuit breaker 10 can comprise the one or more stationary contacts 44 of the second contact assembly 38 and the one or more moving contacts 64 of the first contact assembly 36 of the circuit interrupter 34. Additionally, according to certain embodiments, the moving side shield 56, which can be constructed from an electrically conductive material, such as, for example, aluminum or steel, among other materials, can be sized to house at least a portion of the components of the first contact assembly 36, and can include a first end cap 70 and a first body portion 72 that are directly or indirectly coupled together. Additionally, as shown in at least FIG. 4, the first body portion 72 of the moving side shield 56 can be attached to, and in electrical communication with, the first electrical conductor 14. Further, at least the first body portion 72 of the main moving contact 68 can be coupled to, and be in electrical communication with the puffer piston 58, puffer cylinder 60, plurality of transfer contacts 62, moving arcing contact 66, and main moving contact 68. The moving arcing contact 66 and main moving contact 68 can be coupled to the puffer cylinder 60 such that, during operation of the circuit interrupter 34 such that the moving arcing contact 66 and main moving contact 68 are linearly displaced relative to the second contact assembly 38 and puffer piston 58 via the linear displacement of the puffer cylinder 60.

The second contact assembly 38 can include at least a stationary side shield 42 and one or more stationary contacts 44, such as, for example, a stationary arcing contact 46 and a main stationary contact 48. According to certain embodiments, the stationary side shield 42, which can be constructed from an electrically conductive material such as aluminum or steel, among other materials, can be sized to house at least a portion of the components of the second contact assembly 38, and can include a second end cap 50 and a second body portion 52. Additionally, as shown in at least FIG. 4, the second body portion 52 of the stationary side shield 42 can be attached to, and in electrical communication with, the second electrical conductor 18. Further, as shown in at least FIG. 4, the stationary side shield 42 can include an inward projection 54 that can be coupled to, and be in electrical communication with, the stationary arcing contact 46. Similarly, according to the illustrated embodiment, the main stationary contact 48 can be coupled to, and in electrical communication with, the second body portion 52 of the stationary side shield 42 and positioned so as to extend around an outer periphery of at least a portion of the stationary arcing contact 46.

According to the illustrated embodiment, when the contact 74 of the circuit breaker 10, and thus the circuit interrupter 34, is in the electrically closed position, the puffer cylinder 60 is at a linear position relative to at least the second contact assembly 38 and the puffer piston 58 such that the moving arcing contact 66 is in electrical contact with the stationary arcing contact 46, and the main moving contact 68 is in electrical contact with the main stationary contact 48. When the circuit breaker 10 is operated such that the contact 74 of the circuit breaker 10 is changed from an electrically closed position to an open position, the puffer cylinder 60 can be linearly displaced along at least a portion of the first contact assembly 36 and/or the insulator tube 40 such that the main moving contact 68 and moving arcing contact 66 disengage from being in contact with the main stationary contact 48 and stationary arcing contact 46, respectively, thereby at least attempting to generally terminate the stationary and moving contacts 44, 64 of the circuit interrupter 34 from being in electrical contact with each other.

Figure 4:
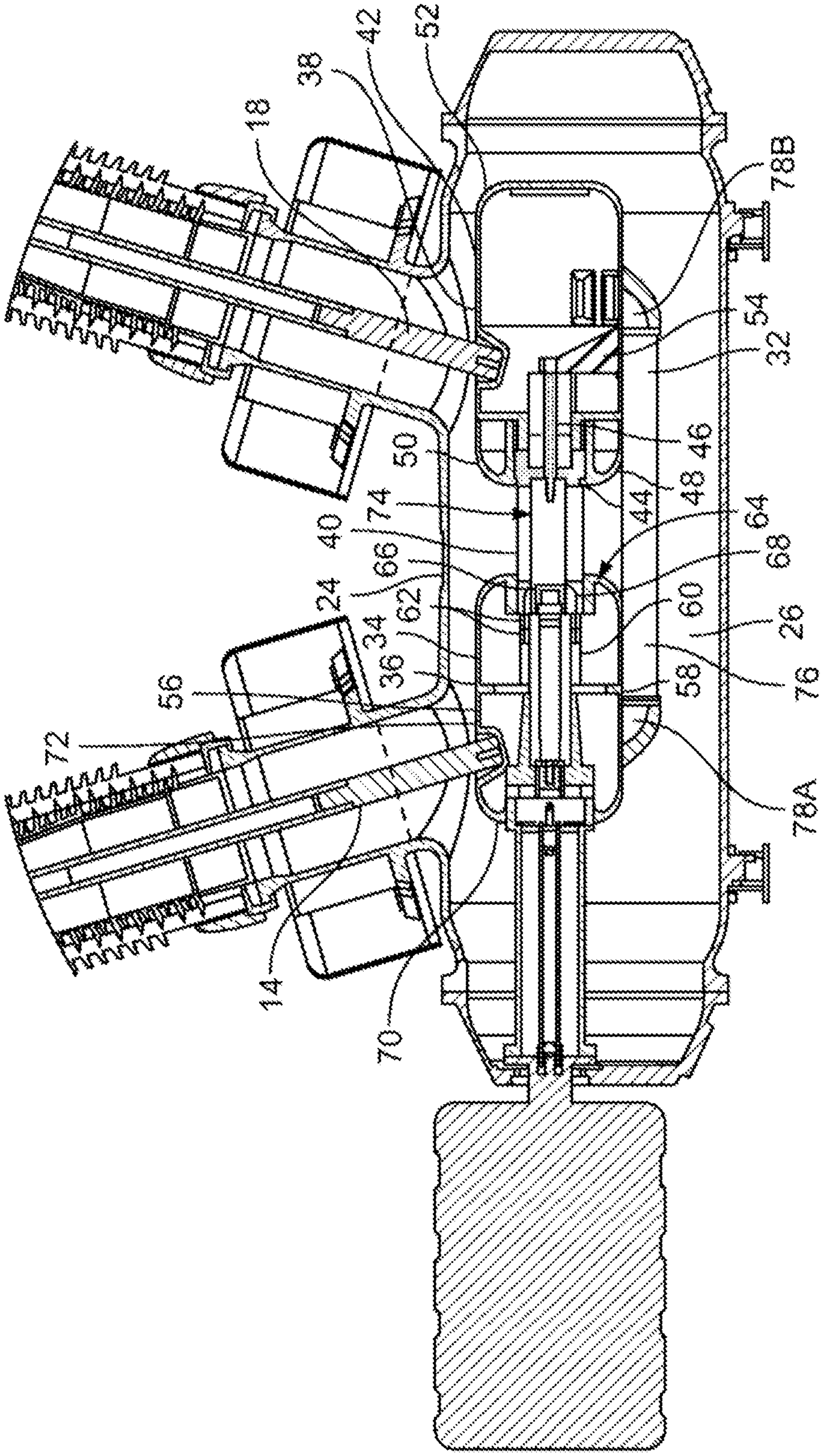
FIG. 4 illustrates a cross sectional view of a portion of a sealed enclosure for a circuit breaker having internal capacitor assemblies according to an illustrated embodiment of the subject application.
Figure 5:
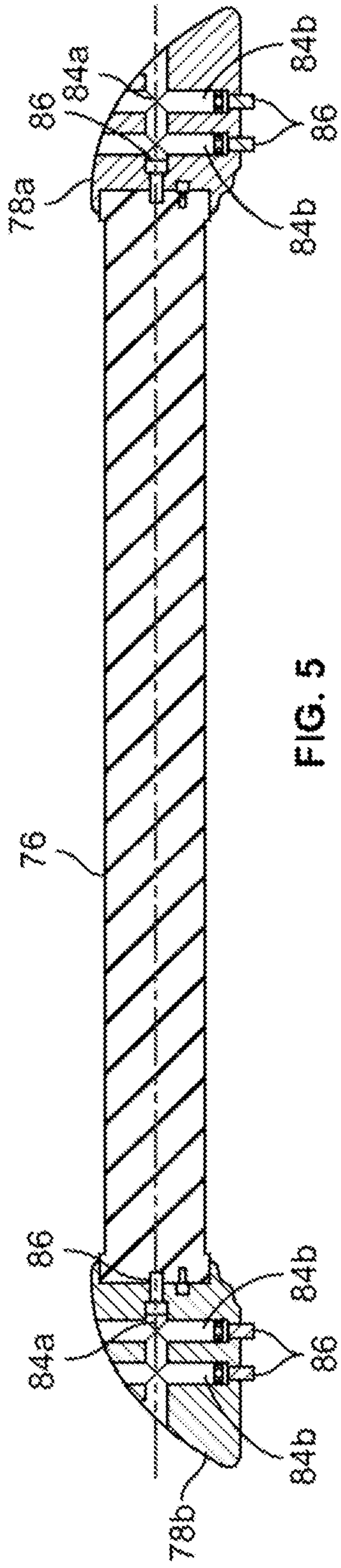
FIG. 5 illustrates a partial cross sectional view of an exemplary internal capacitor assembly according to an illustrated embodiment of the subject application.
Figure 6:
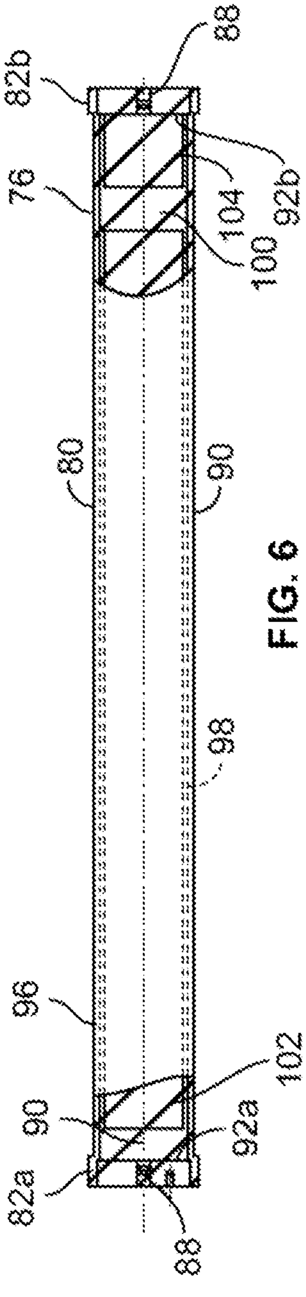
FIG. 6 illustrates a side view of an exemplary capacitor according to an illustrated embodiment of the subject application.

As shown in at least FIGS. 3-5, the internal capacitor assemblies 32 can each include a capacitor portion 76 and one or more mounting brackets 78*a*, 78*b*. The capacitor portion 76 includes a body portion 80 that extends between a first end cap 82*a* and a second end cap 82*b* of the capacitor portion 76. The first and second end caps 82*a*, 82*b* can be constructed from an electrically conductive material, such as, for example, aluminum or steel, among other materials. Further, according to such an embodiment, the first and second end caps 82*a*, 82*b* are each configured to be coupled to an adjacent mounting bracket 78*a*, 78*b* that is configured for attaching the internal capacitor assemblies 32 to the circuit interrupter 34, as discussed below.

According to the illustrated embodiment, the mounting brackets 78*a*, 78*b* can be configured to be coupled to the adjacent first and second end caps 82*a*, 82*b* of an internal capacitor assembly 32 and the circuit interrupter 34. Such coupling of the mounting brackets to the internal capacitor assembly 32 and the circuit interrupter 34 can be achieved in a variety of different manners. For example, as shown in at least FIG. 5, according to certain embodiments, the mounting brackets 78*a*, 78*b* have one or more apertures 84*a*, 84*b* that are sized to receive a fastener(s) 86, such as, for example, a bolt or screw, among, other types of fasteners, that can securely engage an adjacent first or second end cap 82*a*, 82*b* and/or a threaded aperture in the enclosure 24. According to certain embodiments, the apertures 84*a*, 84*b* can include a counter bore that is sized to accommodate placement of at least a head portion of the fastener 86. Additionally, according to certain embodiments in which the fastener(s) 86 is a bolt or screw, at least a portion of the apertures 84*a*, 84*b* of the mounting brackets 78*a*, 78*b*, the apertures 88 in the first or second end caps 82*a*, 82*b*, and/or mating apertures in the circuit interrupter 34 can include an internal thread that is configured to threadingly engage at least a portion of a male thread of the corresponding fastener 86. Further, as shown in at least FIG. 5, according to certain embodiments, the apertures 84*a* of the mounting brackets 78*a*, 78*b* that are used for securing the mounting brackets 78*a*, 78*b* to the first or second end caps 82*a*, 82*b* can be generally perpendicular to the apertures 84*b* of the mounting brackets 78*a*, 78*b* that are used to secure the mounting brackets 78*a*, 78*b* to the circuit interrupter 34.

The body portion 80 of the capacitor portion 76 can include art insulator tube 90 having a first tube end 92*a* and an opposing second tube end 92*b*, the first and second tube ends 92*a*, 92*b* being coupled to the adjacent first and second end caps 82*a*, 82*b*, respectively. The insulator tube 90 can comprise an insulation wall 94 having an outer surface 96 and an surface 98, the inner surface 98 generally defining an interior region 100 of the insulator tube 90. Further, the insulation wall 94 can be constructed from a variety of different electrically insulative materials, including, but not limited to, a hardened epoxy, among other materials. The interior region 100 of the insulator tube 90 can house at least the TRV capacitor 102. The TRV capacitor 102 is configured for mitigating transient recovery voltage (TRV) at least when the contact 74 of the circuit breaker 10, and thus the contacts 44, 64 of the circuit interrupter 34, are being changed from an electrically closed position to an electrically opened position. Moreover, the TRV capacitor 102 is configured to delay terminal fault and short line fault rate of rise of the initial TRV (ITRV) that can appear across the open contact 74 of the circuit breaker 10, and thus provides a time delay that assists in preventing the TRV level from reaching a level that could otherwise result in the failure of the circuit interrupter 34 to interrupt the circuit. The duration of the delay provided by the internal capacitor assembly 32 can be based on a variety of factors, including, for example, the capacitance value of the TRV capacitor 102.

According to certain embodiments, the TRV capacitor 102 can be an oil-filled capacitor, and thus the interior region 100 of the insulator tube 90 can be filled with oil, among other components of the TRV capacitor 102 that are housed within the interior region 100 of the insulator tube 90. Further, according to certain embodiments, the TRV capacitor 102 can also include an expansion element 104, such as, for example, a bellows, that may, or may not, be filled with a gas, such as, for example, nitrogen, among or compressible bodies. The expansion element 104 can be sized to be compressed in response to changes within the interior region 100 of the insulator tube 90, including, for example, changes in the temperature and/or pressure of the oil that is housed within the interior region 100 of the insulator tube 90.

The internal capacitor assembly 32, and thus the TRV capacitor 102, can be directly or indirectly in electrical communication with both the first and second electrical conductors 14, 18, including, but not limited to, when the contact 74 of the circuit breaker 10 is in an electrically open position. Thus, according to certain embodiments, the TRV capacitor 102 can be wired across, and in parallel to, the contact 74 of the circuit breaker 10, as indicated by at least FIG. 7. Such a parallel configuration of the internal capacitor assembly 32, and thus the TRV capacitor 102, can facilitate the TRV capacitor 102 being effective in delaying terminal fault and short line fault ITRV rate of rise regardless of which side of the circuit breaker 10 the limit has occurred and/or is present. Further, as previously discussed, according to certain embodiments, the TRV capacitor 102 of each of the internal capacitor assemblies 32 can be housed with the circuit interrupter 34 within the enclosure 24 such that the internal capacitor assemblies 32 are in relatively close proximity to the contact 74 of the circuit breaker and/or contacts 44, 64 of the circuit interrupter 34. Such internal positioning of the capacitor assemblies 32 within the enclosure 24, and the associated relatively close proximity to the contact 74 of the circuit breaker 10, can allow for use of a capacitor for the TRV capacitor 102 that has a relatively smaller capacitance then if the TRV capacitor 102 were external to the enclosure 24.

For example, according to certain embodiments, and as previously discussed, the mounting brackets 78*a*, 78*b* can be configured to secure one side of each of the internal capacitor assembly 32 to each side of the contacts 46, 66 of the circuit interrupter 34, and thus the contact 74 of the circuit breaker 10, such that the internal capacitor assemblies 32 run across, and parallel to, the contact 74 of the circuit breaker 10. For example, according to the illustrated embodiment, the first mounting bracket 78*a* of an internal capacitor assembly 32 can be attached to the moving side shield 56 of the circuit interrupter 34, while the other mounting bracket 78*b* of the internal capacitor assembly 32 can be attached to the stationary side shield 42 of the circuit interrupter 34. Further, according to certain embodiments, similar to the first and second end caps 82*a*, 82*b* of the internal capacitor assemblies 32, the mounting brackets 78*a*, 78*b* can also be constructed from an electrically conductive material, such as, for example, aluminum or steel, among other materials. Thus, according to at least certain embodiments, the TRV capacitor 102 of the internal capacitor assembly 32 can be in electrical communication with the first and second electrical conductors 14, 18 via the coupling of the first mounting and second brackets 78*a*, 78*b* with electrically conducive portions of the circuit interrupter 34 that are on either side of the contact. More specifically, according to the illustrated embodiment, the first mourning bracket 78*a* of the capacitor assembly 32 can be, via at least coupling of the first mounting bracket 78*a* to the moving side shield 50 of the circuit interrupter 34, be indirectly in electrical communication with the first electrical conductor 14. Similarly, the second mounting bracket 78*b* of the capacitor assembly 32 can be, via at least coupling of the second mounting bracket 78*b* to the stationary side shield 42 of the circuit interrupter 34, be indirectly in electrical communication with the second electrical conductor 18. However, the internal capacitor assemblies 32 can be configured to be in electrical communication with the first and electrical conductors 14, 18 in a variety of other manners such that the TRV capacitor 102 of the internal capacitor assemblies 32 is connected across, and parallel to, the contact 74 of the circuit interrupter 34. For example, according to other embodiments, the TRV capacitor 102 of the internal capacitor assemblies 32 can be, via wired connections, in electrical communication with one or more other components of the first and second contact assemblies 36, 38 of the circuit interrupter 34 such that the internal capacitor assemblies 32 remain in electrical communication with the first and electric it conductors 14, 18 regardless of whether the contact 74 of the circuit breaker 10 is in the open or closed position.

Figure 7:
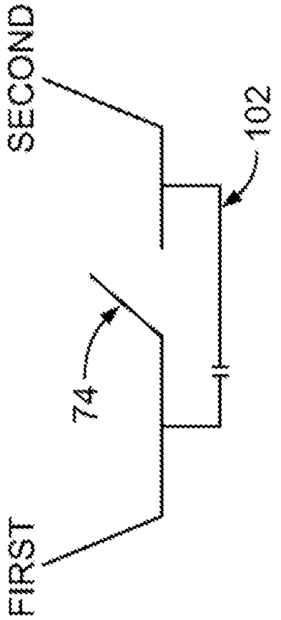
FIG. 7 illustrates a circuit diagram representing an exemplary internal capacitor assembly according to an illustrated embodiment of the subject application connected in parallel to, and on both sides of, a circuit interrupter that is shown in the open position.

Referencing FIG. 7, during operation, when the circuit interrupter 34 is in an electrically closed positon, the electrical current flows through the closed contact 74 of the circuit interrupter 34 such that electrical current can flow into the circuit breaker 10 through one of the first and second electrical conductors 14, 18 and out through the other of the first or second electrical conductors 14, 18. In such situations, in view of the relatively higher impedance across the TRV capacitor 102 and the relatively lower resistance across the circuit interrupter 34, current bypasses the internal capacitor assemblies 32, and instead flows through the closed contact 74 of the circuit breaker 10. When the contact 74 of the circuit breaker 10 is moved from the electrically closed positon to the electrically open position, as shown in FIG. 7, electrical current can proceed to flow through the internal capacitor assemblies 32. Further, as previously mentioned, each internal capacitor assembly 32 is not merely on one side of the contact 74 of the circuit breaker 10, such as, for example, a load side or a source side of the contact 74, but instead extends across both sides, as well as being in connected in parallel to, the contact 74. Thus, with respect to the previously discussed exemplary embodiment, with the contact 74 moving from the closed position to the open position, current can still flow from one of the stationary side shield 42 and the moving side shield 56, through the internal capacitor assembly(ies) 32, to the other of the stationary side shield 42 or moving side shield 56. Such a configuration can allow the TRV capacitor 102 of the internal capacitor assembly(ies) 32 to delay the terminal fault and short line fault ITRV rate of rise that can appear across the opened contact 74 of the circuit breaker 10.

While the invention has been described in connection with what is presently considered to be the most practical and preferred embodiment, it is to be understood that the invention is not to be limited to the disclosed embodiment (s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A circuit breaker comprising:

an enclosure having an inner region;

a contact housed within the inner region of the enclosure, a first side of the contact electrically coupled to a first electrical conductor of the circuit breaker, a second side of the contact electrically coupled to a second electrical conductor of the circuit breaker; and a plurality of capacitor assemblies housed within the inner region of the enclosure, wherein each of the capacitor assemblies is connected in parallel across the contact via a respective individual pair of mounting brackets, and includes a single insulator tube that houses a single transient recovery voltage capacitor such that the transient recovery voltage capacitor is separated from the inner region of the enclosure.

2. The circuit breaker of claim 1, wherein the enclosure is a sealed enclosure that houses a dielectric insulating medium.

3. The circuit breaker of claim 1, wherein, at least when the contact is in an electrically open position, a first side of each of the capacitor assemblies is electrically coupled to the first electrical conductor, and a second side of each of the capacitor assemblies is electrically coupled to the second electrical conductor.

4. The circuit breaker of claim 3, wherein the first electrical conductor is carried in a first bushing and the second electrical conductor is carried in a second bushing.

5. The circuit breaker of claim 1, wherein the contact comprises a first contact assembly and a second contact assembly, the first contact assembly having one or more moving contacts and the second contact assembly having one or more contacts.

6. The circuit breaker of claim 5, wherein a first side of each of the capacitor assemblies is electrically coupled directly to the first contact assembly and a second side of each of the capacitor assemblies is electrically coupled directly to the second contact assembly.

7. The circuit breaker of claim 1, wherein each of the capacitor assemblies further includes an insulator tube, a first end cap and a second end cap, the first and second end caps comprising an electrically conductive material and are attached to opposing ends of the insulator tube, the transient recovery voltage capacitor being housed within the insulator tube.

8. The circuit breaker of claim 7, wherein each of the capacitor assemblies further includes a first mounting bracket and a second mounting bracket, the first and second mounting brackets comprising an electrically conductive material, the first mounting bracket being attached to the first end cap and electrically coupled to a first side of the contact, the second mounting bracket being attached to the second end cap and electrically coupled to a second side of the contact.

9. The circuit breaker of claim 8, wherein the insulator tube is constructed from an epoxy.

10. An apparatus comprising:

an enclosure having an interior region;

a circuit interrupter housed within the interior region, the circuit interrupter having a first contact assembly and a second contact assembly, the second contact assembly comprising at least one stationary contact and a second shield, the first contact assembly comprising at least one moveable contact and a first shield, the at least one moveable contact configured to be:

in contact with the at least one stationary contact when the circuit interrupter is in an electrically closed configuration, and displaced from contact with the at least one stationary contact when the circuit interrupter is in an electrically open configuration; and a plurality of capacitor assemblies housed within the interior region of the enclosure, wherein each of the capacitor assemblies is connected in parallel across the at least one stationary contact via a respective individual pair of mounting brackets and includes a single insulator tube that houses a single transient recovery voltage capacitor such that the transient recovery voltage capacitor is separated from the interior region of the enclosure, a first end of each of the capacitor assemblies being in electrical contact with the first shield, and a second end of each of the capacitor assemblies being in electrical contact with the second shield.

11. The apparatus of claim 10, wherein the circuit interrupter includes a contact comprising the at least one moveable contact and the at least one stationary contact, and wherein each of the capacitor assemblies is electrically connected in parallel across the contact.

12. The apparatus of claim 10, wherein each of the capacitor assemblies comprises a first mounting bracket, a second mounting bracket, and a capacitor portion, the first mounting bracket being electrically coupled to the first shield and a first end of the capacitor portion, the second mounting bracket being electrically coupled to the second shield and a second end of the capacitor portion, and wherein the transient recovery voltage capacitor is housed within the capacitor portion.

13. The apparatus of claim 12, wherein the capacitor portion comprises a first end cap, a second end cap, and a body portion, the first end cap, the second end cap, the first mounting bracket, and the second mounting bracket being constructed from an electrically conductive material, and wherein the first mounting bracket is directly coupled to the first end cap and the second mounting bracket is directly coupled to the second end cap.

14. The apparatus of claim 10, wherein the enclosure is a sealed enclosure that houses an insulating medium.

15. An apparatus comprising:

at least one pole assembly having a first electrical conductor, a second electrical conductor, an enclosure, a circuit interrupter, and a plurality of capacitor assemblies, wherein the circuit interrupter and each of the capacitor assemblies are housed within an interior region of the enclosure, wherein each of the capacitor assemblies has a single insulator tube that houses a single transient recovery voltage capacitor connected in parallel across a contact of the circuit interrupter via a respective individual pair of mounting brackets, and wherein the insulator tube separates the transient recovery voltage capacitor from the interior region of the enclosure.

16. The apparatus of claim 15, wherein the contact of the circuit interrupter includes at least one moveable contact and at least one stationary contact, the at least one moveable contact configured to be:

in contact with the at least one stationary contact when the circuit interrupter is in an electrically closed configuration, and displaced from contact with the at least one stationary contact when the circuit interrupter is in an electrically open configuration.

17. The apparatus of claim 16, wherein the circuit interrupter includes a first contact assembly and a second contact assembly, the first contact assembly comprising the at least one moving contact and being electrically coupled to the first electrical conductor, the second contact assembly comprising the at least one stationary contact and being electrically coupled to the second electrical conductor, wherein a first side the transient recovery voltage capacitor is electrically coupled to the first contact assembly, and a second side of the transient recovery voltage capacitor is electrically coupled to the second contact assembly.

18. The apparatus of claim 17, wherein each of the capacitor assemblies includes a first mounting flange and a second mounting flange, the first and second mounting flanges being at opposing ends of the capacitor assembly, the first mounting flange being directly electrically coupled to a first shield of the first contact assembly, the second mounting flange being directly electrically coupled to a second shield of the second contact assembly.

19. The apparatus of claim 18, wherein at least when the circuit interrupter is in the electrically open configuration, the first shield is electrically coupled to the first electrical conductor, and the second shield is electrically coupled to the second electrical conductor.

20. The apparatus of claim 15, wherein the enclosure is a sealed enclosure that houses an insulating medium.

* * * * *